United States Patent Office 3,033,811
Patented May 8, 1962

3,033,811
AQUEOUS COATING COMPOSITION COMPRISING COPOLYMER, AMINOPLAST AND TERTIARY AMINE AND PROCESS FOR COATING SUBSTRATES THEREWITH
George L. Brown, Moorestown, N.J., and Richard E. Harren, Levittown, Benjamin B. Kine, Elkins Park, and Eric E. Wormser, Hartsville, Pa., assignors to Rohm & Haas Company, Philadelphia, Pa., a corporation of Delaware
No Drawing. Filed Nov. 25, 1959, Ser. No. 855,284
10 Claims. (Cl. 260—29.4)

This invention concerns thermosetting coating compositions which are applied from aqueous media to the surfaces to be coated. Particularly it concerns thermosetting coating compositions which can be applied to primed metal surfaces from aqueous media to provide topcoats which exhibit excellent hardness, toughness, resistance to abrasion, and outstanding adhesion, and outstanding adhesion to the primer coat. Particularly, it concerns thermosetting coating compositions which can be applied from aqueous media to unprimed metal surfaces to provide primer coats which exhibit, when baked, excellent water- and solvent-resistance, high adhesion to the unprimed metal surface, and have high hardness, toughness and resistance to abrasion.

This invention also concerns pigmented thermosetting coating compositions which can be applied from aqueous media to the surfaces to be coated.

Heretofore metals have been protected from corrosion by the application of primers comprising certain corrosion-protective pigments in non-aqueous vehicles based on a drying oil, such as linseed oil, a fast-drying varnish base comprising natural resins, or a mixture of natural and synthetic resins, or an alkyd base modified with a urea-, melamine-, or phenol-formaldehyde resin. Such coating compositions contain volatile solvents frequently of inflammable character and often of a type which gives off noxious fumes during the coating operation. To cope with the fire and health hazards, protection is usually provided in the way of solvent recovery systems.

In the priming of metal surfaces, aqueous systems have heretofore been avoided because of the known tendency of water to initiate corrosion of the metal, especially such common metals as iron and steels which make up the bulk of the metal products that are provided with protective coatings of this type. The initiation of corrosion and the development of rust is contrary to the purpose of applying corrosion-protective primers; and the production of minute oxidized points or areas on the surface of the metals being primed generally has the effect of reducing adhesion and durability of coatings applied over such oxidized points.

Butadiene-styrene lattices have also been used as vehicles for coating compositions but exhibit the disadvantages which are generally associated with unsaturated polymers, i.e., they progressively embrittle and gradually discolor because of continued oxidation.

Because of the desirable properties of thermosetting coating compositions and because water is an inexpensive, readily available, non-inflammable, non-toxic and odor-free medium, there has long been a demand for thermosetting coating compositions which can be applied from aqueous media.

An object of this invention is the preparation of thermosetting coating compositions which can be applied from aqueous media, thus overcoming the dangers inherent and the expense involved in the use of solvent-containing thermosetting coating compositions.

A further object of this invention is the preparation of thermosetting coating compositions which, while applicable from aqueous media, provide after baking clear or pigmented coatings which possess excellent water- and solvent-resistance, excellent adhesion to a variety of substrates, high gloss, and which do not exhibit cold flow or become tacky at elevated temperatures.

A further object of this invention is the preparation of thermosetting compositions which can be applied to metal surfaces from aqueous media to give primer coats which exhibit excellent adhesion to metal surfaces and which, by virtue of their water- and solvent-resistance, permit topcoating with no difficulties.

A further object of this invention is the preparation of thermosetting coating compositions which can be applied from aqueous media and which, on curing, provide coatings which exhibit the very desirable properties attributed to acrylate and methacrylate, but which coatings, being thermoset, do not exhibit cold flow or become tacky at elevated temperatures.

The aqueous thermosetting coating compositions of the present invention are prepared by mixing (1) an aqueous dispersion prepared by copolymerizing (a) at least one monomer selected from the group consisting of styrene, vinyltoluene, acrylonitrile, and acrylic and methacrylic acid alkyl esters in which the alkyl group contains from 1 to 8 carbon atoms with (b) acrylamide or methacrylamide, and the formaldehyde reaction products of said amides including methylol and methoxymethyl derivatives, with (2) a water-soluble, heat-convertible aminoplast. To this mixture is added (3) a volatile tertiary amine and preferably (4) an additive which is a pigment dispersant and which is an amine or ammonium salt of a polymeric carboxylic acid.

It is a prime requisite that components (1), (2), and (3) be present in order to obtain the desired advantages of the present invention. While additive (4) should generally be used with pigmented compositions, it is optional but definitely advantageous when used with non-pigmented or clear compositions. The results obtained show definitely that the presence of additive (4) leads to a more complete cure of the aminoplast and better properties of the final film.

The coating compositions described hereinbefore may be used as clears or may be pigmented with a variety of pigments as set forth hereinafter.

If it is desired to increase the viscosity of these coating compositions, they may be readily thickened with a variety of water-soluble gums. Said water-soluble gums must not be reactive with the other components of the coating composition at room or slightly elevated temperatures, but it is preferred that they decompose at the baking temperatures employed to yield volatile materials which leave the film and/or residues which are water-insoluble or which can undergo reaction with the other components of the composition and thus become water-insolubilized. Thus, the ammonium or lower amine salts of polycarboxylic acids are suitable, and typical examples are ammonium polyacrylate, ammonium polymethacrylate, the salts of polyacrylic and polymethacrylic acids with mono-, di-, and trimethylamine, the salts of polyacrylic and polymethacrylic acids with mono-, di-, and triethylamine, and the ammonium and lower amine salts of the copolymers obtained by polymerizing styrene and maleic anhydride and methylvinyl ketone and maleic anhydride. Certain cellulose derivatives are also suitable such methyl cellulose, ammonium carboxymethyl cellulose, and hydroxyethyl cellulose.

Monomers which are suitable for copolymerizing with acrylamide or methacrylamide and the formaldehyde reaction products of said amides including methylol and methoxymethyl derivatives include the following: styrene, vinyltoluene, acrylonitrile, methyl acrylate, ethyl acrylate, propyl acrylate, isopropyl acrylate, butyl acrylate, hexyl acrylate, heptyl acrylate, n-octyl acrylate, 2-ethylhexyl acrylate and the corresponding esters of methacrylic acid.

Mixtures of acrylate and methacrylate esters are generally employed and the ratios of the acrylate esters to the methacrylate esters employed will depend on many factors. The ratios will depend on the hardness of final coating required for any given application, the particular monomers which are employed, as well as the specific aminoplast used. One preferred embodiment employs ethyl acrylate and methylmethacrylate in ratios of approximately 1:1. This mixture is employed with approximately 2 to 10 parts of methacrylamide per 100 parts of the hereinbefore described monomer mixture. As set forth hereinbefore, the ratios of the acrylic and methacrylic monomer as well as the specific monomers employed will depend to some extent on the amount of aminoplast used. Thus, if a relatively small amount of aminoplast is used, and a hard coating is required, a large proportion of the monomer mixture should be methyl methacrylate, a monomer which polymerizes to a hard polymer. Conversely, if a large amount of aminoplast is employed, a higher proportion of the alkyl acrylates, which polymerize to soft polymers, can be employed without detracting too much from the hardness of the finished coating.

The water-soluble, heat-convertible aminoplasts which are suitable for use in the practice of the present invention include the methylol derivatives of urea, cyclic ethylene urea, cyclic propylene urea, thiourea, cyclic ethylene thiourea, melamine, alkyl melamines, aryl melamines, aryl guanamines, guanamines, alkyl guanamines and mixtures thereof. Generally speaking, water-soluble resins can be prepared according to one of the following schemes: (1) control of reaction conditions so that the degree of polymerization is kept very low, even to the monomeric stage, and (2) introduction of hydrophilic groups into the molecules of the polymeric condensates. Thus, water-soluble, heat-convertible aminoplasts such as dimethylolurea and trimethylolmelamine can be prepared by careful control of reaction conditions as set forth in Schildknecht, "Polymer Processes," vol. X, page 305 et seq. (Interscience Press, 1956). Such simple methylol derivatives frequently exhibit limited solubility in cold water, and are not particularly stable on prolonged storage, tending to polymerize to water-insoluble polymers.

A preferred class of water-soluble aminoplasts are the condensates of formaldehyde and the reaction products of urea and melamine with a lower alkanol, such as methanol. These condensates are heat-convertible to insoluble cross-linked polymers. Thus, the condensates of methoxymethylureas and formaldehyde and methoxymethylmelamines and formaldehyde are particularly suitable for the coating compositions of the present invention. The preparation for ethylene urea derivatives, such as N,N'-bis(methoxymethyl)ethylene urea, is set forth in detail in U.S. 2,373,136. The preparation of methylolmethoxymelamines is set forth in Schildknecht, ibid, page 340. The preparation of suitable methylolmethoxymelamines is also set forth in U.S. Patent 2,529,856, and the date set forth therein is herein incorporated by reference. The preparation of another class of compounds suitable in the present invention, such as N,N'-bis-(methoxymethyl)urea is set forth in Bull. Chem. Soc. Japan, vol. XI, #3, 239 (1936).

The amount of aminoplast employed can be varied over wide limits and still be within the scope of the present invention. Thus, from about 5 to about 55 parts of aminoplast (solids basis) per 100 parts of emulsion polymer (solids basis) can be employed. A preferred range is 15 to 25 parts aminoplast (solids basis) per 100 parts of emulsion polymer (solids basis).

The methods of preparation of the aminoplasts as set forth hereinbefore do not constitute any part of the present invention.

The preferred embodiments of this invention, particularly with combinations which give hard films after baking, employ materials which are designated as "coalescents." These coalescents aid fusion of the film during air-drying prior to baking. These coalescents also promote the flow of coating composition during the baking cycle, but do not form a part of the finished coating. They are characterized by being low in water-solubility, good solvents for the uncured polymer mixture, less volatile than water so that they remain in the film after the water has evaporated, sufficiently volatile that they are removed from the film before the end of the baking cycle, and not susceptible to hydrolysis in alkaline media either at ambient or elevated temperatures. Typical examples are isophorone (3,5,5-trimethylcyclohexen-2-one-1), 2-ethylhexanol, and tributyl phosphate which are used in the amounts of 5 to 10 parts by weight on 100 parts by weight (solids basis) of the coating composition.

The aqueous acrylic dispersions are prepared by polymerizing the mixtures of monomers using "emulsion polymerization" techniques. These techniques are well known to those skilled in the art and consist in agitating a mixture of the monomer in water in the presence of a surfactant and a polymerization catalyst.

Typical emulsifiers which may be used include alkylphenoxypolyethoxyethanols having alkyl groups of about seven to twelve carbon atoms, such as heptylphenoxypolyethoxyethanols, octylphenoxypolyethoxyethanols, methyloctylphenoxypolyethoxyethanols, nonylphenoxyethoxyethanols, dodecylphenoxypoylethoxyethanols, and the like.

The amounts of emulsifier or emulsifiers required vary primarily with the concentration of monomers to be handled and to a minor extent with choice of emulsifier, monomers, and proportions of monomer. Generally, the amount of emulsifying agent is between 2% and 12% of the weight of the mixture of monomers and is preferably 4% to 7% of this weight. If the dispersion is to contain a relatively low concentration of interpolymer somewhat more than the minimum emulsifying agent indicated by the above rule may prove desirable. In such case, the concentration of emulsifying agent in the aqueous solution may desirably be at least 1% of this solution and may be as much as about 7% of the weight of the aqueous solution thereof.

As the polymerization catalyst there may be used one or more peroxides which are known to act as free radical catalysts and which have solubility in aqueous solutions of the emulsifier. Highly convenient are the persulfates, including ammonium, sodium and potassium persulfates or hydrogen peroxide or the perborates or percarbonates. There may also be used organic peroxides, either alone or in addition to an inorganic peroxidic compound. Typical organic peroxides include benzoyl peroxide, tert-butyl hydroperoxide, cumene peroxide, tetralin peroxide, acetyl peroxide, caproyl peroxide, tert-butyl perbenzoate, tert-butyl diperphthalate, methyl ethyl ketone peroxide, etc. The preferred organic peroxides have at least partial solubility in the aqueous medium containing the emulsifying agent. Choice of inorganic or organic peroxidic catalyst depends in part upon the particular combination of monomers to be interpolymerized, some of these responding better to one type than the other.

The amount of peroxidic catalyst required is roughly proportional to the concentration of the mixture of monomers. The usual range is 0.01% to 3% of catalyst with reference to the weight of the monomer mixture. The preferred range is from 0.05% to 0.5%, while the range of 0.1% to 0.25% is usually best. The optimum amount of catalyst is determined in large part by the nature of the particular monomers selected, including impurities which accompany particular monomers.

Another suitable class of free radical generating compounds are the azo catalysts. There may be used, for example, azodiisobutyronitrile, azodiisobutyramide, azobis(α,α-dimethylvaleronitrile), azobis(α-methylbutyronitrile), dimethyl, diethyl, or dibutyl azobis(methylvalerate). These and other similar azo compounds serve as free radical initiators. They contain an —N=N— group attached to aliphatic carbon atoms, at least one of which is tertiary. An amount of 0.01% to 2% on the weight of monomer or monomers is usually sufficient.

In order to effect interpolymerization at a temperature below that at which coagulation might occur, it may be desirable to activate the catalyst. This may best be accomplished by using a so-called redox system in which a reducing agent is present in addition to the peroxidic catalyst. Many examples of such systems are known. Agents such as a soluble sulfite, including hydrosulfites, sulfoxalates, thiosulfates, sulfites, and bisulfites can be used. Examples of these are sodium hydrosulfite, sodium metabisulfite, potassium sulfite, zinc formaldehyde-sulfoxalate, and calcium bisulfite. Tertiary amines may also be employed. Redox systems may be activated by the presence of a small amount of polyvalent metal ions. Ferrous ions are commonly and effectively thus used, a few parts per million being sufficient.

The amounts of reducing agent required vary somewhat with the choices of peroxide initiator, reducing activator or agents, and metal promoter, if used, also with the choice of emulsifying agent, and with the particular monomers involved. Within the limits of about 0.5% to 6% with reference to the weight of the mixture of monomers will be found the amount of reducing agent for practically any system. The preferred amounts of sulfite agent or equivalent fall in the range of 0.2% to 1%.

Copolymerization is best effected below about 80° C. A preferred range is 15° to 70° C., although slightly lower and somewhat higher temperatures are permissible. After most of the monomers have been converted to interpolymer, temperatures even higher than 80° C. may then be applied. In fact, after most of the monomers have interpolymerized, the resulting dispersion can be heated to boiling without breaking the dispersion. During interpolymerization, the temperature can be controlled in part through the rate at which monomers are supplied and interpolymerized and/or through applied cooling.

The polymerization process can be carried out batchwise or continuously. It is possible to work entirely batchwise, emulsifying the entire charge of monomers and proceeding with polymerization. It is usually advantageous, however, to start with part of the monomers which are to be used and add more monomer or monomers as polymerization proceeds. An advantage of gradual addition of monomers lies in reaching a high solids content with optimum control and with maximum uniformity of product. Additional catalyst or additional components of the redox system may also be added as polymerization proceeds.

In the process of polymerization here described, an aqueous emulsion of a mixture of the defined polymerizable monomers was stirred and treated with a redox system starting between about 10° C. and about 40° C. About 0.01% to 1% of a peroxidic catalyst based on the weight of the monomers used is usually an effective amount at the start and the required amount of reducing substance, hydrosulfite, sulfite metabisulfite, or the equivalent for this system, may be of the same order or somewhat more by weight. When interpolymerization starts, the temperature of the mixture rises, usually rather rapidly. Care is taken to keep the temperature of the mixture below the levels at which coagulation might occur.

Amounts of monomers were supplied to bring the content of suspended interpolymer to 25% to 60% of the total suspension, preferably to 45% to 55%. Interpolymerization or copolymerization should be carried on until no more than a few percent of monomers remain in the mixture. When these monomers are volatile, they can be reduced or removed by steam distillation or stripping under reduced pressure, if so desired.

Any water-soluble ionizable compounds present in the completed dispersion may be removed by dialysis, deionization with ion exchange resins, or precipitation. Although it is possible to use the untreated dispersions to prepare the coating compositions of the present invention, the removal of substantially all of the ionizable solids from the dispersion results in a substantial increase in the water-resistance of the final baked coating. This freedom from ionizable components can also result from the preparation of the dispersion in the absence of compounds which are or which yield ionizable compounds.

The term "ion-free" as used in the specification and claims of this application is well-understood by those skilled in the art. Conductivity measurements are most commonly used to determine the degree of freedom from ions or, conversely, the ion content of an aqueous composition. To insure as complete ion removal as possible, common practice is to dialyze or treat with ion exchange resins until conductivity is substantially constant. In the case of ion removal with ion exchange resins, it is obviously necessary to make sure that sufficient ion exchange resins are present to remove all the ions, and for any given system this can be determined by making incremental additions of the ion exchange resins until the conductivity is substantially constant. Typical results of such a determination on a composition of the present invention are set forth hereinafter.

While ion removal by dialysis does yield a suitable product, the process is relatively cumbersome and does not represent the preferred process.

An indicated above, the removal of water-soluble ionizable compounds from the aqueous polymer dispersion or from the complete unpigmented composition can be effected by using ion exchange resins. The preferred method of using the ion exchange resins comprises making a mixture of a sulfonic acid type cation exchanger in the acid form and a quaternary anion exchange resin in the free base form, and treating the composition to be deionized with the mixture. Such mixtures of cation and anion exchange resins are well-known to those skilled in the art as "mixed beds." Batch or continuous deionizing processes can be employed.

With the compositions of the present invention, it is generally sufficient to deionize the aqueous copolymer dispersion before blending with the aminoplast. It may be more convenient to deionize the finished composition, and increased water-resistance of the baked film is also obtained employing this particular method of deionizing. A composition essentially as described hereinafter in Example I but without dispersant and isophorone was prepared using an undeionized acrylic copolymer emulsion. When the acrylic copolymer emulsion, the aminoplast and the amine had been mixed, a mixture of a sulfonated styrene-divinylbenzene copolymer in the acid form (40 parts by volume) and a quaternary anion exchange resin in the free base form (60 parts by volume) was added, using 2 parts by weight of the ion exchange mixture per 100 parts by weight of the coating composition. The mixture was gently agitated for 0.75 hour and the ion exchange resins removed by filtration. The details of the tests conducted were as follows:

| Contact Time, (Hours) | Resistivity, ohms | Water-Resistance | |
|---|---|---|---|
| | | Whitening | Rust |
| 0 | 550 | Severe | Slight-Moderate. |
| 0.25 | 1,360 | Slight | None. |
| 0.50 | 1,400 | ----do------ | None. |
| 0.75 | 1,400 | ----do------ | None. |

As is evident from these data, the deionization occurs very rapidly, and the deionized product exhibits markedly superior water-resistance.

The following experiments were conducted to show the effect of deionization on the electrical resistance of the polymer dispersion and the corrosion-resistance of the complete coating composition after baking on cold steel panels. Since deionization is very fast, a contact period with the ion exchange resin mixture of only 30 minutes was necessary. These experiments also show the effect of varying the amounts of mixed bed resins used. With this particular sample, the maximum specific resistance obtainable was reached with 0.018 gram mixed bed/ml. of acrylic dispersion. Samples of a 45% solids acrylic dispersion prepared by copolymerizing 42.5 parts of ethyl acrylate, 52.5 parts methyl methacrylate, and 5 parts of methacrylamide were treated by adding varying amounts as shown of a mixture of 40 parts by volume of the acid form of a sulfonated styrene-divinylbenzene copolymer and 60 parts by volume of a quaternary anion exchanger in the free-base form. When the ion exchange resins had been removed by filtration, the specific resistance of the dispersion was determined.

The deionized samples were compounded into coating compositions as set forth hereinafter in Example I. They were coated onto cold steel panels, air-dried, and baked 30 minutes at 350° F. They were then immersed in water at 155° F. for 16 hours. They were visually evaluated for rusting using an arbitrary scale of rating:

0—very severe rusting
9—no rusting

The results were as follows:

| Deion. Resin Level (g./ml.) (Contact Time—½ Hour) | .009 | .012 | .015 | .018 | Control (0) |
|---|---|---|---|---|---|
| Spec. Resist. (ohms-cm.) | 1,240 | 1,730 | 3,170 | 3,580 | 640 |
| Corrosion Rating | 2 | 4 | 6 | 8 | 0 |

As is well-known to those skilled in the art, it is possible to prepare copolymer dispersions which are substantially ion-free as prepared by using organic amines in conjunction with peroxides as polymerization catalysts. Typical of such peroxides are hydrogen peroxide and tert-butyl-hydroperoxide. Since such copolymer dispersions are substantially ion-free as prepared, it is not necessary to subject them to the deionization process.

Since it is desired to have the mixture of the acrylic dispersion and the aminoplast stable on prolonged storage, and since the aminoplast is reactive under acid conditions, the mixture must be made alkaline. A tertiary amine is used to make the system alkaline because tertiary amines will not react with the formaldehyde associated with the aminoplast. The tertiary amines also function as corrosion inhibitors when the coating compositions of the present invention are used for coating metal. The tertiary amine must be sufficiently volatile that it will be driven from the film during the baking operation. However, it must not be so volatile that it "flashes" from the film or gasifies if the coating composition is applied by spraying. Typical of such amines are the trialkylamines containing three to twelve carbon atoms, triethanolamine and N-methylmorpholine. Particularly preferred because of the balance of properties, availability and economy is triethylamine. The pH of the mixture should be maintained in the range of 9 to 11 in order to ensure good storage stability. However, it is apparent that initial pH control alone is not sufficient to insure adequate stability and retention of properties since samples neutralized to the desired pH range with ammonia had inadequate stability on prolonged storage, although satisfactory films are obtained if the ammonia-neutralized compositions are used shortly after preparation. However, if the tertiary amine is the predominant nitrogen base present, small amounts of ammonia can be used without deleterious effects. The amounts of amine used will vary depending on the specific composition employed but will be in the range of 1 to 5 parts by weight per 100 parts by weight of coating composition (solids basis). A preferred embodiment employs two parts by weight per 100 parts by weight of the coating composition (solids basis).

When pigments are employed, it is essential to employ a dispersant. While a wide variety of dispersants will satisfactorily disperse pigments, the effect of the dispersant on the properties of the final film must be considered. Many dispersing agents remain in the final film unchanged, thus seriously impairing the water-resistance of the film. Other dispersing agents will adversely affect the stabilities of the systems into which they are incorporated.

Thus, a preferred embodiment employs as dispersants the ammonium and lower amine salts of polymeric carboxylic acids. Thus, the ammonium and lower amine salts of polyacrylic and polymethacrylic acids and similar salts of the polymeric acid obtained by copolymerizing methyl vinyl ether with maleic anhydride are suitable. A particularly preferred embodiment employs the ammonium half amide salt or the diammonium salt of a diisobutylene-maleic anhydride copolymer having a number average molecular weight of from about 2000 to about 4000. The amount of dispersant employed will vary depending on the amount and nature of the pigments used and the amount and nature of the composition employed as binder. Generally, however, from about 0.3 to about 3.5 parts by weight (solids basis) per 100 parts by weight of pigment, will prove to be effective for dispersing the pigment.

It appears that the dispersants of the type hereinbefore described decompose at the temperatures employed in the baking cycle to liberate ammonia or lower amine which is then volatilized. It is further postulated that the carboxylic residuals react either with the amide group of the copolymer or with the aminoplast or both to become insoluble. Regardless of the mechanism involved, the fact that it is observed that this particular class of dispersants, when employed as set forth hereinbefore, do not detract from the excellent water-resistance and other highly desirable properties of the films proves that such catalysis does occur. It has been proven that even clears which contain a small amount of such dispersants exhibit better water- and solvent-resistances than do the same compositions without dispersant, both samples being cured under exactly the same conditions. The amount of dispersant employed in clears varies depending on the amount of aminoplast employed. From about 0.1 to about 1.0 part by weight dispersant per 100 parts by weight (solids basis) of the coating composition will effect the desired catalysis.

The coating compositions of the present invention may, as set forth hereinbefore, be employed as clears, i.e. non-pigmented coatings, or as pigmented coatings. If pigmented, the ratio of pigments to coating solids may be varied widely, depending on the pigment employed and the specific application involved. Thus, the ratio of pigment to coating solids may vary from 1 to 20 to 20 to 1. The clears are particularly useful as "overcoats," i.e. the so-called overprint coatings which are used to protect decorative undercoats without detracting from the decorative effect. Because the clear coatings of the present invention exhibit good clarity, high gloss, excellent solvent- and water-resistance, and high adhesion to a variety of surfaces, they are admirably suited for use as overprint finishes.

The coating compositions of this invention can be applied to a variety of substrates, the only restriction being the ability of the substrate to withstand the baking cycle which is essenial in the processing of said coating compositions. Metals are particularly suitable, whether prime-coated or unprimed. Thus, iron, steel, aluminum, copper, bronze, or brass surfaces prove to be excellent as substrates for the coating compositions of the present invention. Ceramic surfaces and, in some instances, wood surfaces, are also suitable as substrates.

A wide variety of pigments can be employed with the coating compositions of the present invention. The pigments employed, however, must be stable and non-reactive under alkaline conditions, i.e. a pH from about 9 to about 11. Typical pigments which are suitable include titanium dioxide, iron oxide, calcium carbonate, barytes and numerous types of clays.

The coating compositions can be applied by suitable means or equipment, such as with spray guns, with brushes, or rollers, or by dipping, but it is essential that they be baked at elevated temperatures. A preferred embodiment involves the addition of a coalescent to the composition before application to the substrate, and allowing said coated substrate to air-dry at room or slightly elevated temperature. The air-drying cycle should be continued until the film, either clear or pigmented, is substantially free from water. The baking or curing operation is required for at least three reasons. The baking operation volatilizes all the volatile material in the film including any remaining water, traces of monomer, coalescents, and the tertiary amine. It is particularly important that the tertiary amine be volatilized since it inhibits the cure of the aminoplast. The baking operation effects the decomposition of the ammonium or amine salts of the polymeric carboxylic acids, apparently releasing the acid form of the copolymer which may then react with the other components to become insoluble. The baking operation causes the cure of the aminoplast which cross-links and insolubilizes the entire film. Depending on the specific composition being used, the baking temperature may vary from 250° F. to about 350° F. Baking times will vary from about 45 minutes at the lower temperature to about 25 minutes at the higher temperatures. A preferred schedule is 30 minutes at 300° to 350° F.

*Preparation of Intermediates*

PREPARATION OF N,N'-BIS(METHOXYMETHYL)URON, $C_7H_{14}N_2O_4$ (1)

Barium hydroxide (5 grams) and 60 grams of urea were dissolved in 320 cc. of 38% formalin and when the solution was heated in boiling water for ten minutes and was evaporated, there remained a slightly sticky liquid. This was dissolved in the mixture of one liter of methyl alcohol and 6 cc. of concentrated hydrochloric acid, and after leaving the solution to stand for 15 minutes, it was neutralized with barium hydroxide and was filtered. A slightly fluid liquid remained when the filtrate was evaporated. After the inorganic salt was removed by treating it with chloroform, and dimethylolureadimethylether was removed by treating it with ether, it was subjected to vacuum distillation. Yield: crude 126 grams. Found: C, 43.86; H, 7.73; N, 14.74; mol. wt. 188.5; $CH_2O$, 58.32%. Calculated from $C_7H_{14}N_2O_4$: C, 44.19; H, 7.42; N, 14.72; mol. wt. 190.1. Calculated for $4CH_2O/C_7H_{14}N_2O_4$:$CH_2O$, 63.16%.

PREPARATION OF TRIMETHYLOLMELAMINE (2)

Two hundred and sixty-seven parts of 37% aqueous formaldehyde (3.3 moles) was charged into a suitable reactor and its pH was adjusted to about 8 with sodium hydroxide. One hundred and twenty-six parts of melamine (1 mole) was then added. The mixture was heated with agitation until all of the melamine was dissolved. This generally requires a temperature of about 80° C. The resulting syrup was discharged into trays. After cooling, the product solidified in 4 to 5 hours. It was broken into lumps and dried at about 50° C. for approximately 10 hours to a moisture content of about 2% to 3%.

PREPARATION OF THE METHYLATED MELAMINE-FORMALDEHYDE RESIN (3)

One hundred parts of a ground melamine-formaldehyde condensate prepared according to preparation two (2) was mixed with 200 parts of 95% methanol in which 0.5 part of crystalline oxalic acid had been dissolved. The mixture was heated in a reactor with stirring to the reflux point and maintained at this point until the solid material dissolved. This required about 10 to 20 minutes. The reaction mixture may be heated for an additional period of time up to a maximum of 30 minutes. The pH of the resulting syrup was immediately adjusted to about 9 to 9.5 with a 5 N NaOH solution. The syrup was filtered under pressure with a filter aid such as diatomaceous earth. The filtrate was concentrated under vacuum at a temperature of 50° to 60° C. until the viscosity reached the range of 46 to 148 poises or about Z3 to Z6 as determined by the Gardner-Holdt method at 25° C. A sufficient amount of water may be added to adjust the viscosity to the range 12.9 to 17.6 poises or Gardner-Holdt X–Y, to give a product having a resin solids concentration of about 80%. The pH should be adjusted, if necessary, to about 8.5.

PREPARATION OF N,N'-BIS(METHOXYMETHYL) ETHYLENEUREA (4)

Ethyleneurea (258 parts) was dissolved in 500 parts of methanol. Paraformaldehyde (208 parts) and sodium hydroxide (1.6 parts) were dissolved in 500 parts of additional methanol. The formaldehyde solution was gradually added to the ethyleneurea solution at 50° to 60° C. and the resultant mixture was held at this temperature for one hour. The reaction solution was then cooled at 20° C. and made slightly acid by the addition of 8 parts of 37% hydrochloric acid in 40 parts of methanol. The solution warmed spontaneously to 40° C. and was then allowed to stand one hour at room temperature. The acid was neutralized with sodium hydroxide in methanol and the product distilled under reduced pressure. N,N'-bis(methoxymethyl)ethyleneurea (344 parts, 66% of the theoretical) was obtained, distilling at 113° to 130° C. at 5 mm. pressure. Redistillation yields the purified product, boiling point 104° to 105° C. at 2 mm., melting point 39° C. Nitrogen analysis: Found, 15.66%; calculated, 16.09%.

ETHYL ACRYLATE-METHYL METHACRYLATE-METHACRYLAMIDE TERPOLYMERS (5)

A solution was prepared of 25 parts of a methylene bis(diamylphenoxypolyethoxyethanol) having about 35 ether groups in 1000 parts of water. There were mixed 180 parts of ethyl acrylate, 222 parts of methyl methacrylate, and 21.2 parts of methacrylamide. This mixture was added with stirring to the solution. The resulting mixture was cooled to 15° C. A solution of 0.5 part of ammonium persulfate in 1.5 parts of water was then added, followed by addition of a solution of 0.6 part of sodium hydrosulfite in 6 parts of water. Stirring was continued. In a few minutes the temperature of the mixture began to rise and continued to rise, reaching about 60° to 70° C. in a half hour. After five minutes, the mixture was cooled to about 25° C. There were now added 35 parts of the same methylene bis(diamylphenoxypolyethoxyethanol), 201 parts of ethyl acrylate and 249 parts of methyl methacrylate, 23.7 parts of methacrylamide, a solution of 0.6 part of ammonium persulfate in 1.5 parts of water, and 0.8 part of sodium hydrosulfite in 6 parts of water. In a short time, the temperature of the mixture rose to about 75° C. Stirring was continued for ten minutes, then 60 parts of a 1:1 mixture of a sulfonic acid type cation exchanger in the hydrogen form and a weak base anion exchanger in the free base form were added and maintained in contact with the polymeric dispersion at a temperature of 70° C. for a period of 35 hours. The ion exchange resin was then removed from the dispersion by filtration. The dispersion was then cooled to 45° C.

METHYL METHACRYLATE-2-ETHYLHEXYL ACRYLATE-METHACRYLAMIDE TERPOLYMERS (6)

A solution was prepared of 50 parts of diamylphenoxypolyethoxyethanol, having about 30 ether groups, in 1000 parts of water. Thereto were added 210 parts 2-ethylhexyl acrylate, 573 parts of methyl methacrylate and 40 parts of methacrylamide. The temperature was adjusted to 30° C. There was added with stirring a solution of 0.98 part of ammonium persulfate in 2.5 parts of water and a solution of 0.3 part of sodium hydrosulfite in 6 parts of water. The temperature soon began to rise and, with cooling, a maximum of 65° C. was reached. At this temperature 50 parts of a 1:1 mixture of a sulfonic acid type cation exchanger in the hydrogen form and a quaternary ammonium anion exchanger in the free base form were added with very rapid agitation and allowed to react for 4½ hours. The ion exchange beads were removed by filtering through a Tyler Standard screen scale containing a 48 mesh bronze screen.

ETHYL ACRYLATE-VINYL TOLUENE-METHOXYMETHYLMETHACRYLAMIDE - METHACRYLAMIDE POLYMERS (7)

A solution of 11 parts of nonylephenoxypolyethoxyethanol with about 10 ether groups and 22 parts of methylene bis(diamylphenoxypolyethoxyethanol) having about 40 total ether groups was prepared in 1000 parts of water and the solution was cooled to about 30° C. To this were added with stirring 330 parts of ethyl acrylate, 330 parts of vinyl toluene, 15 parts of methoxymethylmethacrylamide and 15 parts of acrylamide. There were then stirred in .33 part of cumene hydroperoxide, .47 part dihydroxyacetone, and .03 part of ferrous sulfate crystals. After polymerization had started, the temperature was allowed to rise to 55° C. and the reaction mixture was maintained at this temperature for 15 minutes. It was then allowed to cool to room temperature.

ETHYL ACRYLATE-METHYL METHACRYLATE-ACRYLAMIDE-STYRENE POLYMER (8)

A solution was prepared from 55 parts of diamylphenoxypolyethoxyethanol having about 30 ether groups in 1000 parts of water. The solution was cooled to 12° C. The vessel was flushed with nitrogen. There were added with stirring 440 parts of ethyl acrylate, 340 parts methyl methacrylate and 37 parts of acrylamide. There were added 1.4 parts of potassium persulfate, then 1.7 parts of sodium hydrosulfite and 0.06 part of ferrous sulfate. Within about 30 minutes the temperature of the mixture began to rise. When 60° C. was reached, a charge of 0.3 part of tert-butylperbenzoate was slowly added. The temperature continued to rise to about 65° to 70° C. The batch was then maintained at 60° C. for three hours before the addition of 100 parts of styrene dispersed in 50 parts of water containing three parts of the above dispersant. To the above reaction there were added 0.12 part of potassium persulfate dissolved in two parts of water and 0.16 part of sodium hydrosulfite dissolved in three parts of water. After three hours reaction time, the batch was cooled to room temperature and then dialysed using Sylvania Cellophane seamless tubing. On removal of the electrolyte, the dispersion was concentrated to 46% solids by removal of the water at 45° C. under reduced pressure.

ETHYL ACRYLATE-METHYL METHACRYLATE-METHACRYLAMIDE-METHYLOLMETHACRYLAMIDE POLYMERS (9)

A solution was prepared from 446 parts of water and 18.1 parts of an aqueous 70% solution of tert-octylphenoxypolyethoxyethanol having about 40 ether groups. Thereto were added with stirring 89 parts of ethyl acrylate, 110 parts of methyl methacrylate, 5.25 parts of methacrylamide and 5.25 parts of methylolmethacrylamide. The temperature of the resulting emulsion was adjusted to 25° C. Thereupon 0.25 part of ammonium persulfate and 0.14 part of sodium hydrosulfite were added followed by two 0.10 part portions of this hydrosulfite. The reaction then began with the temperature of the batch rising about 41° C. in 20 minutes. At this temperature, 13 parts of a 1:1 mixture of a sulfonic acid type cation exchanger in the hydrogen form and a quaternary ammonium type anion exchanger in the free base form were added with very rapid agitation and were allowed to react for 4½ hours. The ion exchange resin was removed by filtering, and the dispersion was allowed to cool at room temperature.

In addition to the use of the compositions of the present invention as coating and adhesive materials, they may be employed in other applications. For instance, when applied to wool and subsequently dried and cured, they effect dimensional stabilization of the wool. Approximately 1 to 10% by weight of the compositions of the present invention on the weight of the wool is adequate to obtain dimensional stability.

They may be employed as binders for fibers, using 1% to 150% by weight on the weight of the fibers and subsequently curing the composition. Typical of such fibers are cotton, sisal, jute, asbestos, glass, and celluloses, such as wood pulp. Such bonded fibrous products can be used in a wide variety of applications, such as insulation, cushioning materials, backing for masking and other types of pressure sensitive tapes. They may be employed as adhesive interlayers for the manufacture of laminar products, typical of which are plywood, safety glass, surfaced metal, wood, and other substrates which may be used for decorative or protective purposes.

This application is a continuation-in-part of Serial No. 789,792, filed January 29, 1959, in the hands of a common assignee, which will be abandoned by failure to respond within the statutory period.

The following examples set forth certain well-defined embodiments of the application of this invention. They are not, however, to be considered as limitations thereof, since many modifications may be made without departing from the spirit and scope of this invention.

Unless otherwise specified, all parts are by weight. Unless otherwise stated, all temperatures are centigrade.

EXAMPLE I

*Clear overprint coating.*—This coating had the following composition:

| | Grams |
|---|---|
| Acrylic copolymer emulsion [1] | 100.0 |
| Aminoplast [2] | 15.0 |
| Triethanolamine | 0.9 |
| Isophorone | 4.8 |
| Dispersant [3] | 5.5 |

Notes:
[1] The acrylic copolymer emulsion was a deionized emulsion of a methyl methacrylate-ethyl acrylate-methacrylamide copolymer 52.5 : 42.5 : 5.0 at 48% solids in water.
[2] The aminoplast was a methylated melamine-formaldehyde resin prepared as set forth hereinbefore. The aminoplast was used as an 80% solids aqueous solution.
[3] The dispersant was the ammonium salt of a maleic anhydride-diisobutylene copolymer with a number average molecular weight of 3000 used as a 22% solids aqueous solution.

The coating was prepared by mixing the aminoplast and the triethanolamine, adding this mixture to the acrylic copolymer emulsion, and then adding the dispersant and the isophorone (the coalescent). This composition was then applied to cold rolled steel panels with a 10 mil (wet film) film applicator and allowed to air-dry at room or slightly elevated temperatures until substantially free from volatiles. The coated panel was then baked for 30 minutes at 350° F.

Similar compositions were prepared using an acrylic copolymer which had not been deionized, with and without dispersant, and the composition set forth in detail hereinbefore from which the dispersant had been omitted. The tests on these composition variations showed clearly the beneficial catalytic effect of the dispersant of the specific type set forth in this invention as shown by the improved wet adhesion and the freedom from rust on the substrate. These tests further point out the value of deionizing the acrylic copolymer emulsion.

EXAMPLE II

An acrylic copolymer of the same composition was freed from ionizable solids by subjecting it to dialysis and employed in the composition of Example I. The results obtained were the same as obtained with the deionized emulsion in all the tests conducted.

EXAMPLE III

*Iron oxide pigmented primer coating.*—This coating had the following composition:

| | Grams |
|---|---|
| Acrylic copolymer emulsion (as in Example I) | 100.0 |
| Aminoplast (as in Example I) | 14.8 |
| Tripropylamine | 1.0 |
| Isophorone | 4.7 |

This mixture was used as a vehicle for 84.5 grams of a pigment paste of the following composition:

| | Grams |
|---|---|
| Brown iron oxide | 135 |
| Barytes | 135 |
| Talc | 68 |
| Water | 105 |
| Isophorone | 3 |
| Dispersant (as in Example I) | 11 |

The vehicle was prepared by mixing the aminoplast and the tripropylamine, adding this mixture to the acrylic copolymer emulsion, and then incorporating the isophorone. The pigment paste was prepared by mixing all the components and then ball milling, or milling on a paint mill until a smooth dispersion was obtained. The vehicle and the pigment paste were combined by using simple stirring or agitation.

The coating composition was applied to cleaned, cold rolled steel or bonderized steel panels by applying with a film applicator (10 mil wet film thickness) or by spraying. These films were then dried at room temperature or slightly elevated temperatures until substantially free from volatiles and baked for 30 minutes at 350° F. Tests on these coated panels showed:

| | |
|---|---|
| Tukon hardness (Knoop hardness number) | 32.0. |
| Microknife adhesion | 3.7. |
| Impact (in. lb.)— | |
| On bonderized steel | 6.0. |
| On cold rolled steel | 50.0. |
| Flexibility (⅛ inch mandrel) | Satisfactory. |
| Water-resistance on cold rolled steel, 140 hours at 100° F | Unaffected. |
| Salt spray resistance, 300 hours on bonderized steel | Unaffected. |

EXAMPLE IV

The dimethylamine salt of a polyacrylic acid of average number molecular weight of 4000 was substituted for the ammonium salt of a maleic anhydride-diisobutylene copolymer employed in Example III. Its dispersing activity was substantially the same, and a smooth well-dispersed pigment paste was obtained. On the basis of the adhesion, hardness, and film resistance values, it also exhibited the same catalysis of the cure of the aminoplast.

EXAMPLE V

*White baking enamel.*—An emulsion master mix of the following composition was prepared:

| | Grams |
|---|---|
| Acrylic copolymer emulsion (as in Example I) | 1500 |
| Triethanolamine | 14.3 |
| Water | 44.1 |
| Isophorone | 71.6 |

A pigment paste of the following composition was prepared:

| | Grams |
|---|---|
| Titanium dioxide (rutile) | 100.0 |
| Dispersant | 2.3 |
| Tributylphosphate | 1.0 |
| Water | 42.5 |
| Triethanolamine | 1.0 |

The emulsion master mix was prepared by agitating all of the components until substantially homogeneous. The order of addition of the components is not critical.

The pigment paste was prepared by mixing the components in a Waring Blendor or by mixing the components and milling in a ball mill until a smooth dispersion was obtained.

To 62.5 grams of the emulsion master mix was added 8.7 grams of an 80% aqueous solution of a methylated melamine-formaldehyde condensate.

To this mixture was added 31 grams of the $TiO_2$ pigment paste, and the pigment was dispersed by stirring. This coating was sprayed onto cold rolled steel and allowed to air-dry until substantially free from volatiles. It was then baked for 30 minutes at 350° F. The properties of this film were as follows:

| | |
|---|---|
| Tukon hardness (Knoop hardness test) | 18. |
| Gloss 60° | 80. |
| Microknife adhesion | 3.7. |
| Impact | 30 in. lb. |
| Flexibility, ⅛ in. mandrel | Satisfactory. |
| Wet adhesion, 136 hr. immersion in water at 100° F | Excellent. |
| Rust | None. |
| Blisters | None. |

EXAMPLE VI

The coating of Example V was compared with a similar coating which contained only 5% of aminoplast solids. The two compositions were sprayed onto cold rolled steel panels, allowed to air-dry until substantially free from volatiles and then baked for thirty minutes at 300° F. The coating of Example V (25% aminoplast solids) showed much better adhesion after 64 hours immersion at room temperature.

EXAMPLE VII

This coating had the following composition.

| | Grams |
|---|---|
| Acrylic copolymer emulsion (as in Example I) | 95.5 |
| Bis(methoxymethyl)ethylene urea | 2.2 |
| Isophorone | 2.2 |
| N-methylmorpholine | 1.0 |

When applied to cold rolled steel panels and baked at 350° F. for 30 minutes, a coating was obtained which exhibited good adhesion and gave good protection of the panel against corrosion.

EXAMPLE VIII

In a similar fashion, the following composition was prepared and tested:

| | Grams |
|---|---|
| Acrylic copolymer emulsion (as in Example I) | 80.0 |
| Isophorone | 4.0 |
| Dispersant (as in Example I) | 1.6 |
| Dimethyloltrimethoxymethyl triazine | 4.7 |
| Triethylamine | 1.0 |

After application to cold rolled steel and air-drying, the panels were baked at 350° F. for 30 minutes. Good wet adhesion and good protection of the panels from corrosion was obtained.

EXAMPLE IX

The following composition was prepared and tested by the methods set forth hereinbefore.

|  | Grams |
|---|---|
| Acrylic copolymer emulsion [1] | 213 |
| Aminoplast (as in Example I) | 14.2 |
| Pigment dispersion: | |
|    TiO$_2$ (rutile) | 68.2 |
|    Water | 29.0 |
|    Dispersant (as in Ex. I) | 1.7 |
|    Tributyl phosphate | 1.0 |
|    Ammonia | 0.1 |
|  | 100.0 |
| Ammonia | 2.0 |

Note:
[1] The acrylic copolymer was a deionized emulsion of a copolymer of ethyl methacrylate-methyl methacrylate-methacrylamide, 66 : 26 : 8, at 47% solids.

Ten mil films of this composition were cast on cold rolled steel, air-dried and baked for 30 minutes at 350° F. The films displayed good adhesion and water-resistance. However, the coating composition had gelled and was unusable after standing for 5 days at room temperature. This gelation clearly shows that pH control with ammonia alone is not satisfactory in order to obtain adequate shelf life.

EXAMPLE X

The following composition was prepared and tested as set forth hereinbefore.

|  | Grams |
|---|---|
| Acrylic copolymer emulsion [1] | 100.0 |
| Aminoplast (as in Example I) | 14.0 |
| Triethylamine | 1.0 |
| Isophorone | 5.0 |

Note:
[1] The acrylic copolymer emulsion was a deionized emulsion of a copolymer of ethyl acrylate-styrene-methacrylamide, 42.5 : 52.5 : 5 at 48% solids.

The composition was cast onto cold rolled steel panels, air-dried and baked 30 minutes at 350° F. Good water-resistance and good adhesion to the panels was noted.

EXAMPLE XI

The following composition was prepared and tested as set forth hereinbefore.

|  | Grams |
|---|---|
| Acrylic copolymer emulsion [1] | 100.0 |
| Aminoplast (as in Example I) | 14.0 |
| Dimethylaminoethanol (50% in H$_2$O) | 0.5 |
| Triethylamine | 1.0 |
| Isophorone | 5.0 |

Note:
[1] The acrylic copolymer emulsion was a deionized emulsion of a copolymer of ethyl acrylate-styrene-methyl methacrylate-methacrylamide, 42.5 : 26.5 : 26.5 at 46% solids.

The films formed on cold rolled steel by air-drying and baking 45 minutes at 325° F. gave excellent protection of the substrate from corrosion and exhibited good adhesion to the panels.

We claim:

1. A process for coating substrates which comprises applying to the surface of said substrates an aqueous thermosetting mixture consisting essentially of (1) 62 to 93.5 parts by weight (on a solids basis) of an aqueous dispersion of a water-insoluble copolymer of (a) 80 to 98 parts by weight of at least one monomer selected from the group consisting of styrene, vinyltoluene, acrylonitrile, and alkyl esters of acrylic and methacrylic acids, said alkyl groups containing one to eight carbon atoms, and (b) 2 to 10 parts by weight of a monomer selected from the group consisting of acrylamide and methacrylamide, and the formaldehyde reaction products of said amides including methylol and methoxymethyl derivatives, (2) 1 to 5 parts by weight of a volatile tertiary amine, (3) 5 to 40 parts by weight of a water-soluble thermosetting aminoplast selected from the group consisting of methylol derivatives of urea, cyclic ethylene urea, cyclic propylene urea, thiourea, cyclic ethylene thiourea, melamine, alkyl melamines, aryl melamines, aryl guanamines, guanamine, alkyl guanamines, mixtures thereof, and condensates of methoxymethylureas and methoxymethylmelamines with formaldehyde, and subjecting said coated substrates to a temperature of from about 250° F. to about 350° F.

2. A process for coating substrates which comprises applying to the surface of said substrates an aqueous thermosetting coating composition consisting essentially of at least one pigment and, as binder of said coating composition, a mixture of (1) 62 to 93.5 parts by weight (on a solids basis) of an aqueous dispersion of a water-insoluble copolymer of (a) 80 to 98 parts by weight of at least one monomer selected from the group consisting of styrene, vinyltoluene, acrylonitrile, and alkyl esters of acrylic and methacrylic acids, said alkyl groups containing one to eight carbon atoms, and (b) 2 to 10 parts by weight of a monomer selected from the group consisting of acrylamide and methacrylamide, and the formaldehyde reaction products of said amides including the methylol and methoxymethyl derivatives, (2) 1 to 5 parts by weight of a volatile tertiary amine, (3) 5 to 40 parts by weight (on a solids basis) of a water-soluble thermosetting aminoplast selected from the group consisting of methylol derivatives of urea, cyclic ethylene urea, cyclic propylene urea, thiourea, cyclic ethylene thiourea, melamine, alkyl melamines, aryl melamines, aryl guanamines, guanamine, alkyl guanamines, mixtures thereof, and condensates of methoxymethylureas and methoxymethylmelamines with formaldehyde, and (4) 0.3 to 3.5 parts by weight, based on 100 parts by weight of pigment, of a dispersant selected from the group consisting of the half-amide ammonium salt and the diammonium salt of diisobutylene-maleic anhydride copolymer, the ammonium and lower alkyl amine salts of polyacrylic and polymethacrylic acids, and the ammonium and lower alkyl amine salts of methyl vinyl ether-maleic anhydride copolymer, and subjecting said coated substrates to a temperature of from 250° F. to about 350° F.

3. A process for coating substrates which comprises applying to the surface of said substrates an aqueous thermosetting coating composition consisting essentially of at least one pigment and, as binder of said coating composition, a mixture of (1) 62 to 93.5 parts by weight (on a solids basis) of an aqueous dispersion of a water-insoluble copolymer of (a) 80 to 98 parts by weight of at least one monomer selected from the group consisting of styrene, vinyltoluene, acrylonitrile, and alkyl esters of acrylic and methacrylic acids, said alkyl groups containing one to eight carbon atoms, and (b) 2 to 10 parts by weight of a monomer selected from the group consisting of acrylamide and methacrylamide, and the formaldehyde reaction products of said amides including the methylol and methoxymethyl derivatives, (2) 1 to 5 parts by weight of a volatile tertiary amine, (3) 5 to 40 parts by weight (on a solids basis) of a water-soluble thermosetting aminoplast selected from the group consisting of methylol derivatives of urea, cyclic ethylene urea, cyclic propylene urea, thiourea, cyclic ethylene thiourea, melamine, alkyl melamines, aryl melamines, aryl guanamines, guanamine, alkyl guanamines, mixtures thereof, and condensates of methoxymethylureas and methoxymethylmelamines with formaldehyde, (4) 0.3 to 3.5 parts by weight, based on 100 parts by weight of pigment, of a dispersant selected from the group consisting of the half-amide ammonium salt and the diammonium salt of diisobutylene-maleic anhydride copolymer and (5) 5 to 10 parts by weight of a coalescent, based on 100 parts by weight of the coating composition solids, air-drying said coated substrate until substantially free from water, and subsequently subjecting said coated subtrates to a temperature of from about 250° F. to about 350° F.

4. A process for coating substrates which comprises applying to the surface of said substrates an aqueous thermosetting deionized mixture consisting essentially of (1) 62 to 93.5 parts by weight (on a solids basis) of an aqueous dispersion of a water-insoluble copolymer of (a) 80 to 98 parts by weight of at least one monomer selected from the group consisting of styrene, vinyltoluene, acrylonitrile, and alkyl esters of acrylic and methacrylic acids, said alkyl groups containing one to eight carbon atoms, and (b) 2 to 10 parts by weight of a monomer selected from the group consisting of acrylamide and methacrylamide, and the formaldehyde reaction products of said amides including methylol and methoxymethyl derivatives, (2) 1 to 5 parts by weight of a volatile tertiary amine, (3) 5 to 40 parts by weight of a water-soluble thermosetting aminoplast selected from the group consisting of methylol derivatives of urea, cyclic ethylene urea, cyclic propylene urea, thiourea, cyclic ethylene thiourea, melamine, alkyl melamines, aryl melamines, aryl guanamines, guanamine, alkyl guanamines, mixtures thereof, and condensates of methoxymethylureas and methoxymethylmelamines with formaldehyde, and subjecting said coated substrates to a temperature of from about 250° F. to about 350° F.

5. A composition suitable for use as a clear coating composition and as a binder in pigmented coating compositions consisting essentially of a mixture of (1) 62 to 93.5 parts by weight (on a solids basis) of an aqueous dispersion of a water-insoluble copolymer of (a) 80 to 98 parts by weight of at least one monomer selected from the group consisting of styrene, vinyltoluene, acrylonitrile and alkyl esters of acrylic and methacrylic acids, said alkyl group containing from one to eight carbon atoms, and (b) 2 to 10 parts by weight of a monomer selected from the group consisting of acrylamide and methacrylamide, and the formaldehyde reaction products of said amides including the methylol and methoxymethyl derivatives, (2) 1 to 5 parts by weight of a volatile tertiary amine, and (3) 5 to 40 parts by weight (on a solids basis) of a water-soluble thermosetting aminoplast selected from the group consisting of methylol derivatives of urea, cyclic ethylene urea, cyclic propylene urea, thiourea, cyclic ethylene thiourea, melamine, alkyl melamines, aryl melamines, aryl guanamines, guanamine, alkyl guanamines, mixtures thereof, and condensates of methoxymethylureas and methoxymethylmelamines with formaldehyde.

6. A composition suitable for use as a clear coating composition and as a binder in pigmented coating compositions, said compositions being a deionized mixture consisting essentially of (1) 62 to 93.5 parts by weight (on a solids basis) of an aqueous dispersion of a water-insoluble copolymer of (a) 80 to 98 parts by weight of at least one monomer selected from the group consisting of styrene, vinyltoluene, acrylonitrile and alkyl esters of acrylic and methacrylic acids, said alkyl group containing from one to eight carbon atoms, and (b) 2 to 10 parts by weight of a monomer selected from the group consisting of acrylamide and methacrylamide, and the formaldehyde reaction products of said amides including the methylol and methoxymethyl derivatives, (2) 1 to 5 parts by weight of a volatile tertiary amine, and (3) 5 to 40 parts by weight (on a solids basis) of a water-soluble thermosetting aminoplast selected from the group consisting of methylol derivatives of urea, cyclic ethylene urea, cyclic propylene urea, thiourea, cyclic ethylene thiourea, melamine, alkyl melamines, aryl melamines, aryl guanamines, guanamine, alkyl guanamines, mixtures thereof, and condensates of methoxymethylureas and methoxymethylmelamines with formaldehyde.

7. A composition suitable for use as a clear coating composition and as a binder in pigmented coating compositions consisting essentially of a mixture of (1) 62 to 93.5 parts by weight (on a solids basis) of an aqueous dispersion of a water-insoluble copolymer of (a) 80 to 98 parts by weight of at least one monomer selected from the group consisting of styrene, vinyltoluene, acrylonitrile and alkyl esters of acrylic and methacrylic acids, said alkyl group containing from one to eight carbon atoms, and (b) 2 to 10 parts by weight of a monomer selected from the group consisting of acrylamide and methacrylamide, and the formaldehyde reaction product of said amides including the methylol and methoxy methyl derivatives, (2) 1 to 5 parts by weight of a volatile tertiary amine, (3) 5 to 40 parts by weight (on a solids basis) of a water-soluble thermosetting aminoplast selected from the group consisting of methylol derivatives of urea, cyclic ethylene urea, cyclic propylene urea, thiourea, cyclic ethylene thiourea, melamine, alkyl melamines, aryl melamines, aryl guanamines, guanamine, alkyl guanamines, mixtures thereof, and condensates of methoxymethylureas and methoxymethylmelamines with formaldehyde, and (4) 0.1 to 3.5 parts by weight of a compound selected from the group consisting of the half-amide ammonium salt and the diammonium salt of diisobutylene-maleic anhydride copolymer, the ammonium and lower alkyl amine salts of polyacrylic and polymethacrylic acids, and the ammonium and lower alkyl amine salts of methyl vinyl ether-maleic anhydride copolymer.

8. A composition suitable for use as a clear coating composition and as a binder in pigmented coating compositions comprising a mixture consisting essentially of (1) 62 to 93.5 parts by weight (on a solids basis) of an aqueous dispersion of a water-insoluble copolymer of (a) 80 to 98 parts by weight of at least one monomer selected from the group consisting of styrene, vinyltoluene, acrylonitrile and alkyl esters of acrylic and methacrylic acids, said alkyl group containing from one to eight carbon atoms, and (b) 2 to 10 parts by weight of a monomer selected from the group consisting of acrylamide and methacrylamide, and the formaldehyde reaction products of said amides including the methylol and methoxymethyl derivatives, (2) 1 to 5 parts by weight of a volatile tertiary amine, (3) 5 to 40 parts by weight (on a solids basis) of a water-soluble thermosetting aminoplast selected from the group consisting of methylol derivatives of urea, cyclic ethylene urea, cyclic propylene urea, thiourea, cyclic ethylene thiourea, melamine, alkyl melamines, aryl melamines, aryl guanamines, guanamine, alkyl guanamines, mixtures thereof, and condensates of methoxymethylureas and methoxymethylmelamines with formaldehyde, and (4) 0.1 to 3.5 parts by weight of a compound selected from the group consisting of the half-amide ammonium salt and the diammonium salt of diisobutylene-maleic anhydride copolymer, the ammonium and lower alkyl amine salts of polyacrylic and polymethacrylic acids, and the ammonium and lower alkyl amine salts of methyl vinyl ether-maleic anhydride copolymer, any ionizable material present in said composition consisting entirely of said components (3) and (4).

9. A composition suitable for use as a clear coating composition and as a binder in pigmented coating compositions consisting essentially of a mixture of (1) 62 to 93.5 parts by weight (on a solids basis) of an aqueous dispersion of a water-insoluble copolymer of (a) 80 to 98 parts by weight of at least one monomer selected from the group consisting of styrene, vinyltoluene, acrylonitrile and alkyl esters of acrylic and methacrylic acids, said alkyl groups containing from one to eight carbon atoms, and (b) 2 to 10 parts by weight of a monomer selected from the group consisting of acrylamide and methacrylamide, and the formaldehyde reaction products of said amides including the methylol and methoxymethyl derivatives, (2) 1 to 5 parts by weight of a volatile tertiary amine, and (3) 5 to 40 parts by weight (on a solids basis) of a water-soluble thermosetting aminoplast selected from the group consisting of methylol derivatives of urea, cyclic ethylene urea, cyclic propylene urea, thiourea, cyclic ethylene thiourea, melamine, alkyl melamines, aryl melamines, aryl guanamines, guanamine, alkyl guanamines, mixtures thereof, and condensates of methoxymethylureas and methoxymethylmelamines with formaldehyde, any ionizable material present in said combination consisting entirely of said component (3).

10. A process for coating substrates which comprises applying to the surface of said substrates an aqueous thermosetting mixture consisting essentially of (1) 62 to 93.5 parts by weight (on a solids basis) of a deionized aqueous dispersion of a water-insoluble copolymer of (a) 80 to 98 parts by weight of at least one monomer selected from the group consisting of styrene, vinyltoluene, acrylonitrile, and alkyl esters of acrylic and methacrylic acids, said alkyl groups containing one to eight carbon atoms, and (b) 2 to 10 parts by weight of a monomer selected from the group consisting of acrylamide and methacrylamide, and the formaldehyde reaction products of said amides including methylol and methoxymethyl derivatives, (2) 1 to 5 parts by weight of a volatile tertiary amine, (3) 5 to 40 parts by weight of a water-soluble thermosetting aminoplast selected from the group consisting of methylol derivatives of urea, cyclic ethylene urea, cyclic propylene urea, thiourea, cyclic ethylene thiourea, melamine, alkyl melamines, aryl melamines, aryl guanamines, guanamine, alkyl guanamines, mixtures thereof, and condensates of methoxymethylureas and methoxymethylmelamines with formaldehyde, and subjecting said coated substrates to a temperature of from about 250° F. to about 350° F.

References Cited in the file of this patent

UNITED STATES PATENTS

| | | |
|---|---|---|
| 2,497,074 | Dudley et al. | Feb. 14, 1950 |
| 2,871,213 | Graulich et al. | Jan. 27, 1959 |
| 2,886,474 | Kine et al. | May 12, 1959 |

FOREIGN PATENTS

| | | |
|---|---|---|
| 201,429 | Australia | Feb. 24, 1956 |